Patented May 12, 1931                                                              1,805,103

UNITED STATES PATENT OFFICE

DONALD H. POWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE

RUBBER ACCELERATOR

No Drawing.                     Application filed May 10, 1927.   Serial No. 190,383.

This invention relates to an improvement in the vulcanization of rubber and more particularly to the use of new organic compounds as accelerators of vulcanization to be more specifically referred to hereinafter.

The use of piperidyldithiocarbamidate of piperidine for the preparation of hard rubber is described by Hoffman and Gottlob in U. S. Patent 1,130,903 (Example 3). U. S. patent to Bruni, 1,386,153, mentions the use of a metallic salt of a dithiocarbamic acid at temperatures below 120° C. Further, U. S. Patents 1,440,962, 1,440,963, and 1,440,964, to Cadwell contain charts referring to groups represented by the following formulas:—

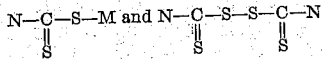

Of these patents to Cadwell, Patents 1,440,963 and 1,440,964 mention the metallic and organic salts of several dithio carbamic acids resulting from the action of carbon disulphide on certain aliphatic and aromatic amines, the substituted thiuram mono- and di-sulphides, the xanthogenates, and other similar compounds. These compounds have advantages in that in general a smaller amount of accelerator causes vulcanization in a shorter time and at a lower temperature than can be realized with a larger amount of the older accelerators such as di-ortho tolyl guanidine or ethylidine aniline in a longer time and at a higher temperature. However, in most cases they act so rapidly that convenient handling of the rubber stocks prior to curing is not possible without scorching. These disadvantages have greatly limited the use of these compounds in general practice. Cadwell also discloses the use of dipiperidylthiuramdisulphide (U. S. Patent 1,449,493), a chart referring to the group represented by the formula

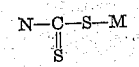

(U. S. Patent 1,510,652), and the metallic salt of a dithiocarbamate (U. S. Patent 1,513,122).

Although the piperidine salt of piperidyl dithionate has long been known as indicated by Hoffman above, its use has been very limited because it effects vulcanization at temperatures below 100° C. and extremely rapidly at temperatures above 100° C.

Other compounds which have been prepared and which have certain accelerating values include oxazines such as benzomorpholine

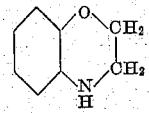

(Ber 32, 732) and naphthalene-morpholine

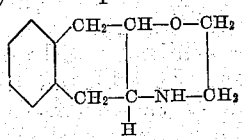

Richter Vol. III, p. 261.

My invention has as an object the use of new organic compounds as accelerators of vulcanization and the process of producing new rubber products therefrom. Another object of my invention is a process whereby vulcanization is effected in hot air cures with new organic accelerators which are not retarded by the presence of lead salts in the rubber mix. A further object of my invention is a rubber accelerator which may be used for vulcanization with advantages at temperatures from 115° C. to 145° C. A still further object of my invention is the use of new organic compounds which may be prepared from relatively inexpensive intermediates.

I have found that the morpholine salt of morpholyl dithionic acid, prepared by the reaction of carbon disulphide on morpholine, as indicated by the equation

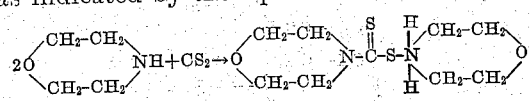

is a very active accelerator at 20 pounds steam pressure, but is practically inactive at 100° C. It is further particularly adapted for use in the manufacture of boots and shoes since it effects vulcanization rapidly in a dry heat at temperatures of 120 to 125° C. As a measure of relative activity a rubber stock containing 0.5% of piperidyl piperidine dithionate is overcured in 45 minutes at 5 pounds steam pressure, while 0.5% of morpholyl morpholine dithionate gives a good cure in 45 minutes at 20 pounds steam pressure.

In connection with my study of morpholine derivatives the morpholine salt of morpholyl dithionic acid has been oxidized with alcoholic iodine to give a new thiuram disulphide which probably has the following formula:

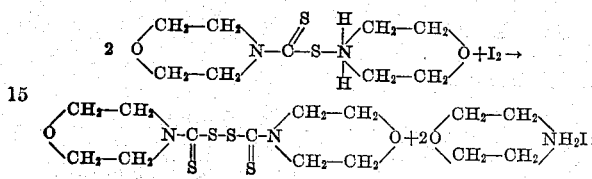

The following example represents the preferred method of preparing a morpholyl dithionate, but it is to be understood that this is only illustrative.

Eighty-six pounds of morpholine is mixed with one hundred pounds of ether cooled to 5° C., in a kettle equipped with agitation, brine coils, and a reflux condenser. Forty pounds of carbon disulphide is added to the cooled, agitated solution, using the usual precautions for handling this material. The morpholine salt of morpholyl dithionic acid separates as a white crystalline powder insoluble in ether and soluble in water, in practically quantitative yields. A sample of this material tested in a rubber mix gives the following cures:

| | Parts |
|---|---|
| Smoked sheet | 100 |
| Sulfur | 3.5 |
| Zinc oxide | 3.0 |
| Morpholyl dithionate | 0.5 |

| Time in minutes | Pressure pounds | 600% | Tensile strength at break lbs./sq. in. | Elongation |
|---|---|---|---|---|
| 15 | 20 | 325 | 3,100 | 875 |
| 30 | 20 | 450 | 2,650 | 845 |
| 45 | 20 | 525 | 2,775 | 830 |
| 60 | 20 | 650 | 2,625 | 790 |

Besides the morpholine salt of the morpholyl dithionic acid, I have also found that it is possible to prepare other salts of morpholyl dithionic acid such as the sodium, zinc, lead, and potassium salts, most probably represented by the following formulas:

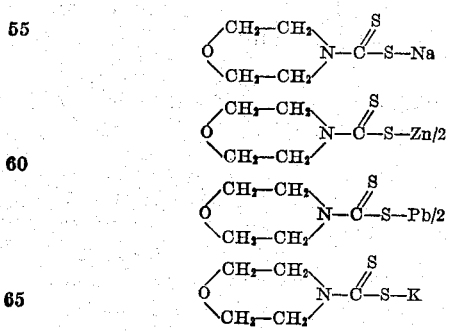

These salts, also, when treated with an oxidizing agent such as chlorine, bromine, or hydrogen peroxide, behave similarly to the morpholine salt of morpholyl dithionic acid and yield the new compound which is believed to be a thiuram disulfide, a yellow crystalline powder. The reaction is most probably represented by the following equation:

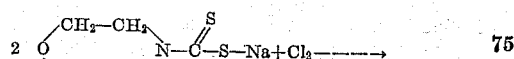

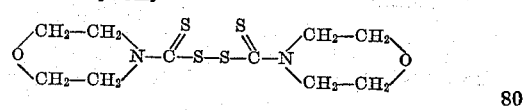

This thiuram disulfide, prepared by the oxidation of either the morpholyl or metal salts of morpholyl dithionic acid, in alcohol solution with KCN gives a product which is believed to be a thiuram-mono-sulfide, most probably represented by the following formula:

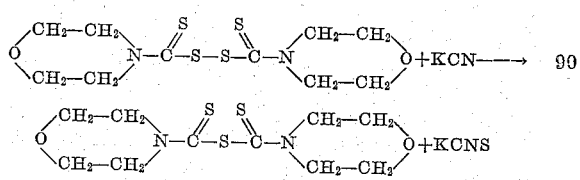

It is believed that when a salt of morpholyl dithionic acid such as the potassium salt is treated with a cyanogen halide (CNCl) that the thiuram mono sulfide, represented most probably by the above formula, is also formed, according to the following equation:

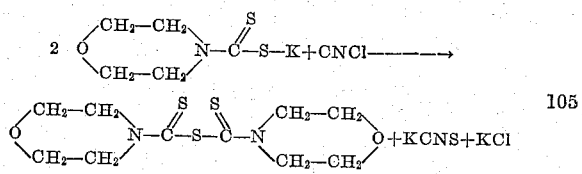

All of these products have been found to be very active accelerators of vulcanization. As many apparently widely different embodiments of this invention may be made without departing from the spirit thereof, it is to be understood that I do not limit myself to the foregoing examples or description, except as indicated in the following patent claims.

I claim:

1. As a new product, a compound containing the grouping

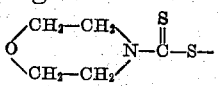

2. As a new product, a compound containing the grouping

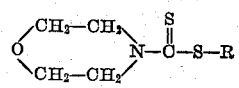

in which R is an organic radical.

3. As a new product, a cyclic compound containing the grouping

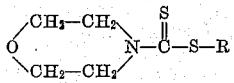

in which R represents a substituent of the class consisting of the radical

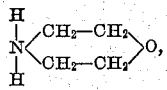

the radical

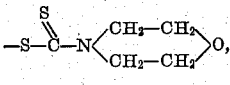

the radical

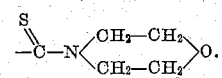

4. A compound which comprises the reaction product of carbon bisulfide and morpholine.

5. In the vulcanization of rubber, the step of incorporating therewith, prior to vulcanization, a reaction product of the type set forth in claim 3.

6. In the vulcanization of rubber, the step of incorporating therewith a reaction product of the type set forth in claim 4.

7. The rubber product obtained by the vulcanization of rubber in the presence of a compound of the type set forth in claim 3.

8. The rubber product produced by the vulcanization of rubber in the presence of the reaction product of carbon bisulfide and morpholine.

9. The process of treating rubber, which comprises incorporating with the rubber a vulcanizing agent and a morpholine derivative of the type set forth in claim 3 and thereafter subjecting the mixture to vulcanizing temperatures.

10. The process of treating rubber, which comprises incorporating with the rubber a vulcanizing agent and about 0.5% of the reaction product of 1 mole of carbon disulfide and 2 moles of morpholine and thereafter vulcanizing at 20 pounds steam pressure.

In testimony whereof I affix my signature.

DONALD H. POWERS.